(12) United States Patent
Hagiwara

(10) Patent No.: US 8,953,302 B2
(45) Date of Patent: Feb. 10, 2015

(54) ELECTROCHEMICAL DEVICE AND A SEPARATOR FOR ELECTROCHEMICAL DEVICE

(71) Applicant: Taiyo Yuden Co., Ltd., Tokyo (JP)

(72) Inventor: Naoto Hagiwara, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 205 days.

(21) Appl. No.: 13/705,937

(22) Filed: Dec. 5, 2012

(65) Prior Publication Data

US 2013/0148266 A1 Jun. 13, 2013

(30) Foreign Application Priority Data

Dec. 7, 2011 (JP) ................................ 2011-267797

(51) Int. Cl.
*H01G 9/00* (2006.01)
*H01G 9/02* (2006.01)
*H01G 11/52* (2013.01)
(52) U.S. Cl.
CPC ................. *H01G 9/02* (2013.01); *H01G 11/52* (2013.01); *Y02E 60/13* (2013.01)
USPC .......................................... 361/502; 361/503
(58) Field of Classification Search
CPC ....... H01M 2/1686; H01G 9/02; H01G 11/52; H01G 9/155
USPC .......................................... 361/502, 512, 523
See application file for complete search history.

(56) References Cited

U.S. PATENT DOCUMENTS 6,097,587 A * 8/2000 Inagawa et al. ............... 361/502

FOREIGN PATENT DOCUMENTS

| JP | 63-224143 | 9/1988 |
| JP | 2000-285896 | 10/2000 |
| JP | 2002-252146 | 9/2002 |
| JP | 2008-085017 | 10/2008 |

OTHER PUBLICATIONS

Japanese Office Action dated Oct. 23, 2013 of Japanese Patent Appln. No. 2011-267797 (5 pages including translation).

* cited by examiner

*Primary Examiner* — Dion R Ferguson
(74) *Attorney, Agent, or Firm* — Pillsbury Winthrop Shaw Pittman, LLP

(57) ABSTRACT

One of the objects of the present invention is to provide a separator for an electrochemical device, capable of suppressing an increase in a resistance value of a storage element.

In accordance with one aspect of the present invention, a separator 16c for an electrochemical device is formed such that plural high porosity portions 16c1 from an upper surface to a lower surface in a thickness direction thereof and plural low porosity portions 16c2 from the upper surface to the lower surface in the thickness direction thereof are arranged in a region which is interposed between a positive electrode 16a and a negative electrode 16b.

4 Claims, 8 Drawing Sheets

ELECTROCHEMICAL DEVICE AND A SEPARATOR FOR ELECTROCHEMICAL DEVICE

CROSS-REFERENCE TO PRIOR APPLICATION

This application claims foreign priority under 35 USC §119 to Japanese Application No. 2011-267797 filed Dec. 7, 2011, the contents of which is incorporated herein in its entirety.

TECHNICAL FIELD

The present invention relates to a separator useful for a storage element of an electrochemical device having a structure in which a chargeable and dischargeable storage element and an electrolytic solution are sealed in a container and an electrochemical device including the storage element using the separator.

BACKGROUND ART

In general, while at present, there are a surface mount (square-shaped) electrochemical device, a coin-shaped electrochemical device, a thin electrochemical device and a cylinder-shaped electrochemical device as types of electrochemical device, all of the devices commonly have a structure in which a chargeable and dischargeable storage element and an electrolytic solution are sealed in a container and the storage element has a structure in which a separator is interposed between a positive electrode and a negative electrode. The separator is made of an ion-permeable porous sheet and functions to avoid a short circuit (short) of a positive electrode and a negative electrode and to deliver ions between the positive electrode and the negative electrode through the retained electrolytic solution.

When the separator delivers ions between the positive electrode and the negative electrode using the retained electrolytic solution, and the electrochemical device is repeatedly charged and discharged to be used for a long time, a phenomenon occurs in which the electrolytic solution retained in the separator decreases due to decomposition of the electrolytic solution and the like.

When the separator is made of a fiber sheet having approximately uniform porosity, and the electrolytic solution retained in the separator is decreased, a delivery path for ions is narrowly secured through the electrolytic solution which adheres to the surface of the fiber. However, since the fiber which forms the separator is not entirely provided parallel to a thickness direction of the separator, the delivery path for the ions is elongated in comparison with a case where a necessary and sufficient amount of the electrolytic solution is retained, a resistance value of the storage element is increased due to the elongated delivery path, and an inner resistance value of the electrochemical device is increased due to the increase in the resistance value, causing a drop in output voltage.

Even if the "approximately uniform porosity" of the separator is changed, it is difficult to avoid the increase in the resistance value of the storage element. That is, when the "approximately uniform porosity" is high, the delivery path for the ions in the separator may be easily cut. Meanwhile, when the "approximately uniform porosity" is low, a retainable amount of the electrolytic solution may be decreased so that a necessary and sufficient amount of the electrolytic solution may not be retained in the separator.

Patent Document 1 below describes a separator in which a high density layer of low porosity and a low density layer of high porosity overlap each other in a thickness direction of the separator. The respective high density layer and low density layer are not in contact with a positive electrode and a negative electrode, and therefore when the amount of the electrolytic solution retained in the separator is decreased, a delivery path for ions is elongated as described above, increasing a resistance value of a storage element.

In addition, Patent Document 2 below describes a separator in which the porosity of a portion protruding outwardly from a positive electrode and a negative electrode is lower than the porosity of a portion interposed between the positive electrode and the negative electrode. The porosity of the portion interposed between the positive electrode and the negative electrode is approximately uniform, and therefore when an amount of an electrolytic solution retained in the separator is decreased, a delivery path for ions is elongated as described above, increasing a resistance value of a storage element.

CITATION LIST

Patent Literature

PTL 1: Japanese Unexamined Patent Application Publication No 2008-085017
PTL 2: Japanese Unexamined Patent Application Publication No 2000-285896

SUMMARY

The present invention provides a separator for an electrochemical device which is capable of suppressing an increase in a resistance value of a storage element and an electrochemical device.

In order to achieve the object, the present invention (a separator for an electrochemical device) is a separator usable in an electrochemical device having a structure in which a chargeable and dischargeable storage element having a configuration in which the separator is interposed between a positive electrode and a negative electrode and an electrolytic solution are sealed in a container. The separator includes a plurality of high porosity portions from one side surface to another side surface in a thickness direction of the separator and a plurality of low porosity portions from the one side surface to the other side surface in the thickness direction of the separator, the high porosity portions and the low porosity portions being arranged in a region interposed between the positive electrode and the negative electrode.

Further, the present invention (an electrochemical device) is an electrochemical device having a structure in which a chargeable and dischargeable storage element having a configuration in which a separator is interposed between a positive electrode and a negative electrode and an electrolytic solution are sealed in a container. The separator includes a plurality of high porosity portions from one side surface to another side surface in a thickness direction of the separator and a plurality of low porosity portions from the one side surface to the other side surface in the thickness direction, the high porosity portions and the low porosity portions being arranged in a region interposed between the positive electrode and the negative electrode.

According to the present invention (a separator for an electrochemical device and an electrochemical device), the separator includes a plurality of high porosity portions from an upper surface to a lower surface in a thickness direction of the separator and a plurality of low porosity portions from the upper surface to the lower surface in the thickness direction of the separator, being arranged in a region interposed between a positive electrode and a negative electrode.

Therefore, even in a case where the amount of the electrolytic solution retained in the separator is decreased, since the solution absorption of each of the low porosity portions is higher than solution absorption of each of the high porosity portions, the electrolytic solution in each of the high porosity portions is accumulated in each of the low porosity portions, and a liquid path for ion delivery is secured between the positive electrode and the negative electrode by the electrolytic solution accumulated in each of the low porosity portions.

In other words, even in a case where the amount of the electrolytic solution retained in the separator is decreased, unlike the related art, since the liquid path for ion delivery is not elongated and the shortest liquid path for ion delivery may be secured, an increase in the resistance value of the storage element is suppressed and an increase in the inner resistance value and a decrease in the output voltage of the electrochemical device can be suppressed by the suppression of the resistance value.

The object, other objects, the configuration characteristics and the effects of the present invention will be apparent from the following description and the appended drawings.

DESCRIPTION OF EMBODIMENTS

<<Example Configuration of Electrochemical Device>>

Figure 1:
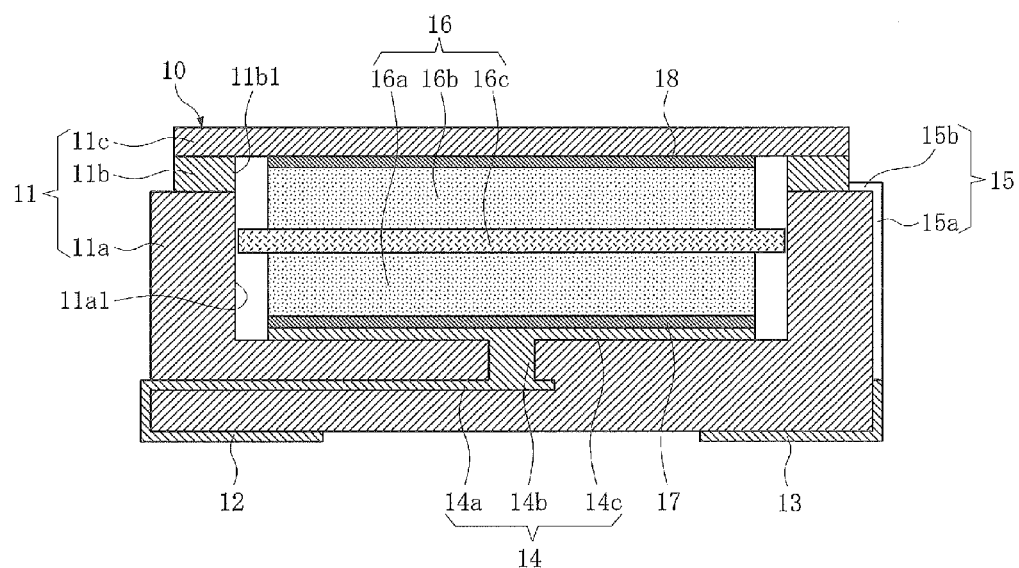
FIG. 1 is a longitudinal sectional view of a surface mount (square-shaped) electrochemical device to which the present invention is applied.

A surface mount (square-shaped) electrochemical device to which the present invention is applied will be described with reference to FIG. 1. As illustrated in FIG. 1, an electrochemical device 10 has a structure in which a chargeable and dischargeable storage element 16 having a structure in which a separator 16c is interposed between a positive electrode 16a and a negative electrode 16b and an electrolytic solution (not shown) are sealed in a container 11.

The container 11 includes an insulating component 11a which is formed in an approximately rectangular parallelepiped shape and has a recess section 11a1, a welding ring 11b which is formed in an approximately rectangular frame shape and welded to an upper surface of the insulating component 11a in advance so as to surround an opening of the recess section 11a1, and a metal component 11c which is formed in an approximately rectangular plate shape and welded and electrically connected to the ring 11b so as to block the opening of the recess section 11a1. Seam welding, laser beam welding, or the like may be used for welding the metal component 11c to the ring 11b.

The insulating component 11a is made of an insulating material such as alumina, and a welding auxiliary film (for example, a multilayer film which is formed of a tungsten film and a nickel film in a case where the insulating component 11a is made of alumina and the ring 11b is made of Kovar; not shown) is formed in a ring welding region. In addition, a positive terminal 12, a negative terminal 13, a positive wire 14 and a negative wire 15 described later are provided in the insulating component 11a.

The ring 11b is made of a metal material such as Kovar (an iron-nickel-cobalt alloy) or a 42 alloy (an iron-nickel alloy) and welded to the welding auxiliary film of the insulating component 11a through a welding material (for example, a silver-copper alloy in a case where the ring 11b is made of Kovar; not shown). Since a contour of an inner hole 11b1 of the ring 11b illustrated in FIG. 1 approximately matches the contour of the opening of the recess section 11a1, the inner hole 11b1 is used as an opening side end section of the recess section 11a1 (hereinafter referred to as the recess section 11a1 including the inner hole 11b1 of the ring 11b). Moreover, a corrosion resistant film to an electrolytic solution (for example, a multilayer film which is formed of a nickel film, a gold film or both the nickel film and the gold film in a case where the ring 11b is made of Kovar; not shown) is formed at least on an inner circumferential surface of an exposed surface of the ring 11b.

The metal component 11c is made of a metal material such as Kovar (a Fe—Ni—Co alloy) or a 42 alloy (a Fe—Ni alloy), preferably a clad material having a nickel film on upper and lower surfaces of a Kovar base material, a clad material having a nickel film on a lower surface of a Kovar base material, or a clad material in which the nickel films are changed to metal films such as platinum, silver, gold and palladium. A contour of a lower surface of the metal component 11c approximately matches a contour of an upper surface of the ring 11b.

The positive terminal 12 is made of a metal material such as gold, and is formed to have an "L" letter-shape cross section extending from a lower portion of a left side surface of the insulating component 11a to a lower surface thereof and to have a predetermined width. The negative terminal 13 is made of a metal material such as gold, and is formed to have an "L" letter-shape cross section extending from a lower portion of a right side surface of the insulating component 11a to the lower surface thereof and to have approximately the same width as the positive terminal 12. When both terminals 12 and 13 do not obtain sufficient adhesion due to the material of the insulating component 11a, an adhesion auxiliary layer (for example, a multilayer film which is formed of a tungsten film and a nickel film in a case where the insulating component 11a is made of alumina and the both terminals 12 and 13 are made of gold; not shown) may be formed in a terminal forming region of the insulating component 11a.

The positive wire 14 has a band-shaped portion 14a extending from an upper end of the positive terminal 12 to a right side of the inside of the insulating component 11a, a column-shaped portion 14b extending from the right end of the band-shaped portion 14a to an upper side of the inside of the insulating component 11a, and a rectangular-shaped portion 14c formed on an inner bottom of the recess section 11a1 so as to communicate with an upper end of the column-shaped portion 14b. The band-shaped portion 14a is electrically connected to the positive terminal 12. The band-shaped portion 14a and the column-shaped portion 14b are made of a metal material such as tungsten and the rectangular-shaped portion 14c is made of a metal material such as aluminum having sufficient corrosion resistance to the electrolytic solution. When the column-shaped portion 14b and the rectangular-shaped portion 14c do not obtain sufficient conductivity due to the material thereof, a conduction auxiliary layer (for example, a multilayer film which is formed of a nickel film and a gold film in a case where the column-shaped portion 14b is made of tungsten and the rectangular-shaped portion 14c is made of aluminum; not shown) may be formed on an upper surface of the column-shaped portion 14b.

The negative wire 15 has a band-shaped portion 15a extending from an upper end of the negative terminal 13 to an upper side of a side surface of the insulating component 11a, and a band-shaped portion 15b extending from an upper end of the band-shaped portion 15a to a left side on the upper surface of the insulating component 11a, and the band-shaped portion 15a is electrically connected to the negative terminal 13 and the band-shaped portion 15b is electrically connected to the ring 11b. While both the band-shaped portions 15a and 15b are made of a metal material such as tungsten, a multilayer film as a protection layer which is formed of a nickel film and a gold film may be formed on the surfaces of both the band-shaped portions 15a and 15b.

The positive electrode 16a and the negative electrode 16b of the storage element 16 have rectangular contours and predetermined thicknesses, and the separator 16c has a rectangular contour slightly larger than those of the positive electrode 16a and the negative electrode 16b and a predetermined thickness. The separator 16c is made of an ion-permeable porous sheet such as a glass fiber sheet, a cellulose fiber sheet, or a plastic fiber sheet, and the thickness thereof is preferably in a range of 50 to 300 μm.

The lower surface of the positive electrode 16a is electrically connected to the rectangular-shaped portion 14c which adheres to a conductive adhesive film 17 on the upper surface of the rectangular-shaped portion 14c of the positive wire 14. In addition, the upper surface of the negative electrode 16b is electrically connected to the metal component 11c which adheres to a conductive adhesive film 18 on the lower surface of the metal component 11c through. Both of the conductive adhesive films 17 and 18 are formed of a cured material of a conductive adhesive, and a thermosetting adhesive which contains conductive particles (for example, an epoxy adhesive which contains carbon particles (carbon black) or graphite particles) is used for the conductive adhesive.

In the case of the electrochemical device 10 in which the same material is used for the positive electrode 16a and the negative electrode 16b, for example, a PAS capacitor or an activated carbon capacitor, the positive electrode 16a and the negative electrode 16b are made of a carbon-based material such as activated carbon and graphite, a conductive polymer such as a polyacenic organic semiconductor (PAS), or a metal oxide such as ruthenium oxide. In addition, propylene carbonate, propylene carbonate+sulfolane (mixed solvent), propylene carbonate+ethyl isopropyl sulfone (mixed solvent), propylene carbonate+sulfolane+propionate methyl (mixed solvent), and sulfolane+ethyl methyl sulfone (mixed solvent) may be preferably used for a solvent of the electrolytic solution (in which an electrolyte dissolves in a solvent) in this case, and 5-azoniaspiro[4,4]nonane.BF4, TEMA.BF4, TEA.BF4, 1-ethyl-2,3-dimethylimidazolium.BF4, and 1-ethyl-3-dimethylimidazolium.BF4 can be preferably used for a electrolyte.

In the case of the electrochemical device 10 in which different materials are used for the positive electrode 16a and the negative electrode 16b, for example, a lithium ion capacitor, among carbon-based materials, the positive electrode 16a is made of, for example, activated carbon and the negative electrode 16b is made of a material in which the lithium ions can be absorbed or separated, for example, non-graphitizable carbon (hard carbon) or graphite. In addition, propylene carbonate, ethylene carbonate and sulfolane can be preferably used for a solvent of the electrolytic solution (in which an electrolyte dissolves in a solvent) in this case and a lithium salt such as $LiPF_6$, $LiBF_4$ and $LiClO_4$ may be preferably used for an electrolyte.

<<Examples of Separator>>

First to third examples of the separator 16c illustrated FIG. 1 will be described with reference to FIGS. 2 to 4. As illustrated FIGS. 2 to 4, the separator 16c is formed such that plural high porosity portions 16c1 from the upper surface to the lower surface in the thickness direction thereof and plural low porosity portions 16c2 from the upper surface to the lower surface in the thickness direction thereof are arranged in a region which is interposed between the positive electrode 16a and the negative electrode 16b. Moreover, as illustrated in FIG. 1, the upper surface of each of the high porosity portions 16c1 and the low porosity portions 16c2 in the region interposed between the positive electrode 16a and the negative electrode 16b of the separator 16c is in contact with the lower surface of the negative electrode 16b, and the lower surface of each of the high porosity portions 16c1 and the low porosity portions 16c2 is in contact with the upper surface of the positive electrode 16a.

The high porosity portions 16c1 and the low porosity portions 16c2 of each separator 16c are described in detail. As seen in the top view of FIG. 2, the high porosity portions 16c1 of the separator 16c in FIG. 2 are formed with plural rectangular-shaped portions (a total of seventy seven portions in FIG. 2), the low porosity portions 16c2 are formed around each of the high porosity portions 16c1 and formed with plural band-shaped portions which are continuously formed in a lattice shape, and the high porosity portions 16c1 are positioned in the outer circumferential portion of the separator 16c (a portion which protrudes outwardly from the positive electrode 16a and the negative electrode 16b). In addition, the shape of the upper surface of each high porosity portion 16c1 may be any shape (for example, a circular shape, an elliptical shape, a semicircular shape, a triangular shape or a polygonal shape having five or more sides) other than the rectangular shape.

Figure 3:
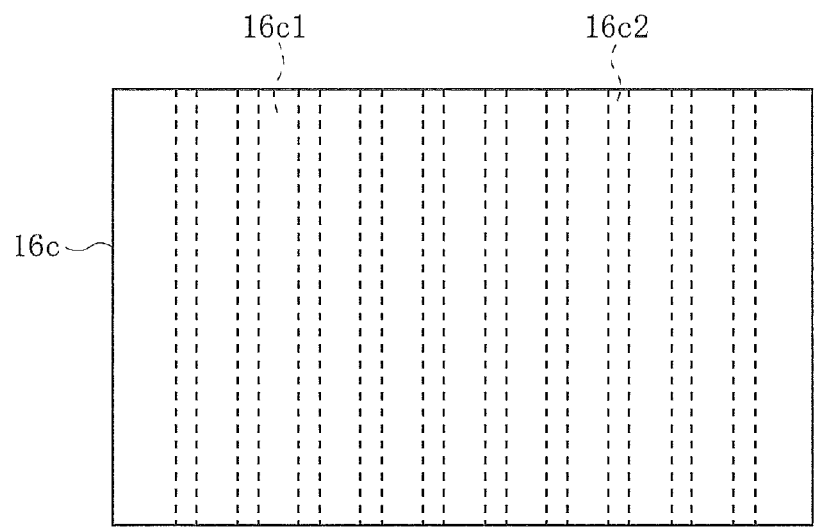
FIG. 3 is a top view of a second example of the separator illustrated in FIG. 1.

In addition, as seen in the top view of FIG. 3, the high porosity portions 16c1 of the separator 16c in FIG. 3 are formed with plural vertical band-shaped portions (a total of eleven portions in FIG. 3), the low porosity portions 16c2 are formed with plural vertical band-shaped portions (a total of ten portions in FIG. 3) between the high porosity portions 16c1, and the high porosity portions 16c1 are positioned in the outer circumferential portion of the separator 16c (a portion which protrudes outwardly from the positive electrode 16a and the negative electrode 16b).

Figure 4:
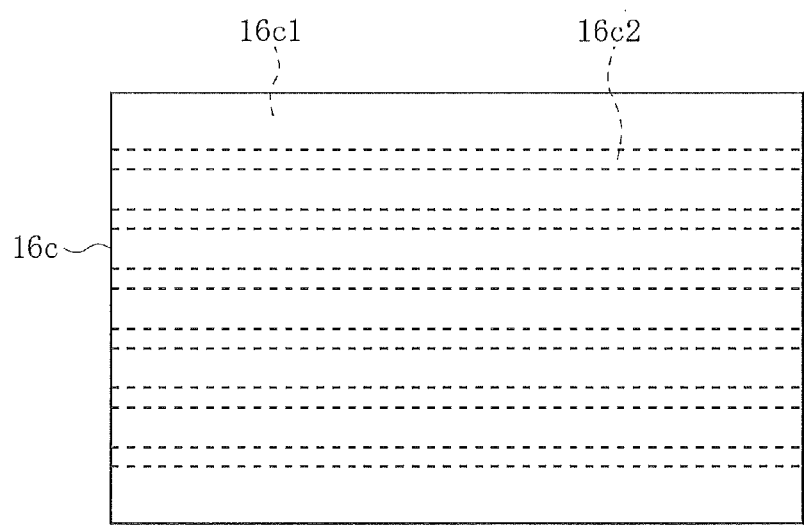
FIG. 4 is a top view of a third example of the separator illustrated in FIG. 1.

Furthermore, as seen in the top view of FIG. 4, the high porosity portions 16c1 of the separator 16c in FIG. 4 are formed with plural lateral band-shaped portions (a total of seven portions in FIG. 4), the low porosity portions 16c2 are formed with plural lateral band-shaped portions (a total of six portions in FIG. 4) between the high porosity portions 16c1, and the high porosity portions 16c1 are positioned in the outer circumferential portion of the separator 16c (a portion which protrudes outwardly from the positive electrode 16a and the negative electrode 16b).

Figure 2:
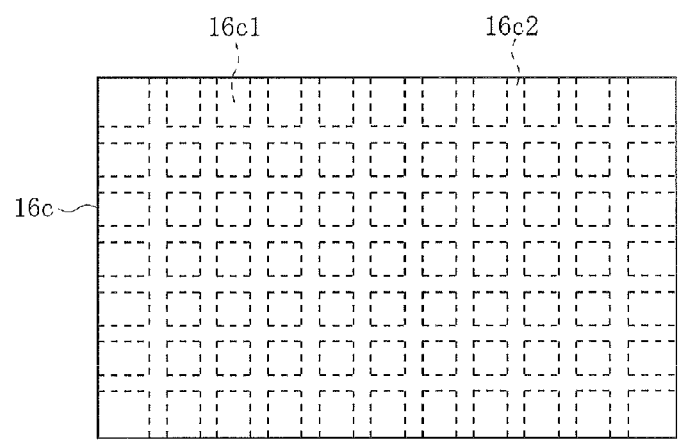
FIG. 2 is a top view of a first example of a separator illustrated in FIG. 1.

The porosity of the high porosity portions 16c1 of each separator 16c illustrated in FIGS. 2 to 4 is preferably in a range of 90 to 95%. When the porosity of the high porosity portions 16c1 is higher than 95%, the electrolytic solution leaks out from the separator 16c since the force with which the electrolytic solution flows out is larger than the force which retains the electrolytic solution therein. Moreover, when the porosity of the high porosity portions 16c1 is lower than 90%, it is difficult to have a noticeable difference in solution absorbing degree from a preferable upper limit in porosity of the low porosity portions 16c2 described later. On the other hand, the porosity of the low porosity portions 16c2 of each separator 16c is preferably in a range of 60 to 80%. When the porosity of the low porosity portions 16c2 is higher than 80%, it is difficult to have a noticeable difference in solution absorbing degree from a preferable lower limit in porosity of the high porosity portions 16c1 described above. In addition, when the porosity of the low porosity portions 16c2 is lower than 60%, the amount of the electrolytic solution which is retainable in the separator 16c is decreased.

The volume ratio of the high porosity portions 16c1 and the low porosity portions 16c2 of each separator 16c illustrated in FIGS. 2 to 4, specifically, the volume ratio of the high porosity portions 16c1 and the low porosity portions 16c2 in the region interposed between the positive electrode 16a and the negative electrode 16b is preferably in a range of 8:2 to 2:8, and more preferably in a range of about 1:1. When the volume percent of the high porosity portions 16c1 is higher than 80%, the amount of the electrolytic solution supplied from the high porosity portions 16c1 to the low porosity portions 16c2 is not much increased, a delivery path for ions by the low porosity portions 16c2 is not easily secured, and substantially, there is no difference from a case in which the separator 16c is formed of the high porosity portions 16c1 only. On the other hand, when the volume percent of the high porosity portions 16c1 is lower than 20%, since the amount of the electrolytic solution which is retainable in the high porosity portions 16c1 is decreased, substantially, there is no difference from a case in which the separator 16c is formed of the low porosity portions 16c2 only. That is, in order to avoid the disadvantage to be caused when the volume percent of the high porosity portions 16c1 is higher than 80% and the disadvantage to be caused when the volume percent of the high porosity portions 16c1 is lower than 20%, a volume ratio of 1:1 which is a medium volume ratio of 8:2 to 2:8 and a volume ratio which is close to 1:1 are preferable.

<<Manufacture Examples of Separator Illustrated in FIG. 2>>
<First Manufacture Example>

Figure 5:
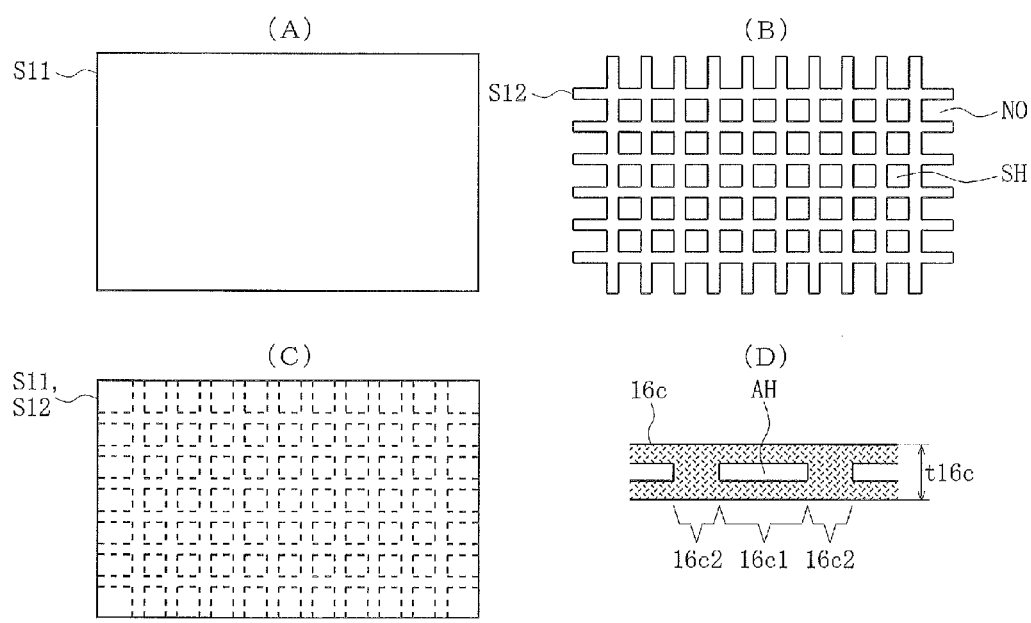
FIGS. 5(A) to 5(D) are explanatory diagrams of a first manufacture example of the separator illustrated in FIG. 2.

In a first manufacture example, as illustrated in FIGS. 5(A) and (B), first, a first sheet base material S11 with a size corresponding to the size of the separator 16c and a second sheet base material S12 obtained by forming notches NO and through holes SH by a method such as punching are prepared. Next, as illustrated in FIG. 5(C), an operation of overlapping one second sheet base material S12 and one first sheet base material S11 sequentially on a first sheet base material S11 is performed at least once and the overlapped base materials are impregnated with a binder solution and thereafter the entirety thereof is heated and pressed at predetermined temperature and pressure.

As illustrated in FIG. 5(D), the separator 16c manufactured in this manner has the notches NO and the through holes SH of the second sheet base material S12 as hollows AH therein, and a thickness portion including the hollows AH becomes the high porosity portion 16c1 and a thickness portion not including the hollows AH becomes the low porosity portion 16c2. The thickness t16c of the separator 16c can be controlled using the heating and pressing process.

<Second Manufacture Example>

Figure 6:
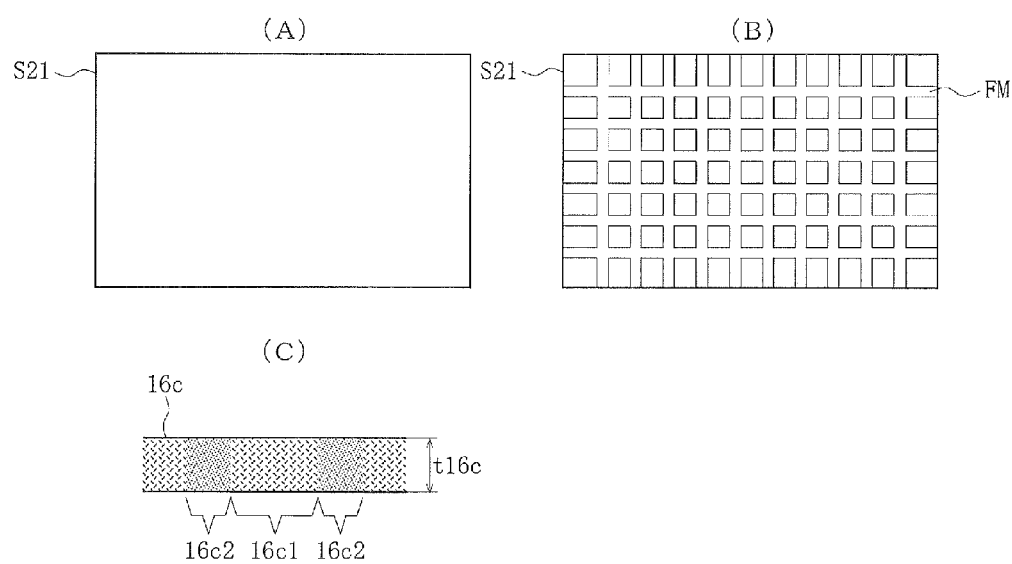
FIGS. 6(A) to 6(C) are explanatory diagrams of a second manufacture example of the separator illustrated in FIG. 2.

In a second manufacture example, as illustrated in FIG. 6(A), first, a sheet base material S21 with the size corresponding to the size of the separator 16c is prepared. Next, as illustrated in FIG. 6(B), a filling material FM formed of porous fine particles such as alumina particles is printed on the upper surface of the sheet base material S21 in a lattice shape, and the inside of the sheet base material S21 is filled with the filling material FM. When two or more sheet base materials S21 overlap each other after being filled with the filling material FM, the overlapped base materials are impregnated with a binder solution and thereafter the entirety thereof is heated and pressed at predetermined temperature and pressure.

As illustrated in FIG. 6(c), a thickness portion which is not filled with the filling material FM becomes the high porosity portion 16c1 and a thickness portion which is filled with the filling material FM becomes the low porosity portion 16c2 in the separator 16c manufactured in this manner. The thickness t16c of the separator 16c can be controlled using the heating and pressing process when two or more sheet base materials S21 overlap each other after being filled with the filling material FM.

<<Manufacture Examples of Separator Illustrated in FIGS. 3 and 4>>
<First Manufacture Example>

As illustrated in FIG. 7(A), first, a sheet base material S31 with a size smaller than the size of the separator 16c is prepared in this manufacture example. Next, as illustrated in FIGS. 7(B) and (C), plural sheet base materials S31 are arranged on a table TA so as to partially (refer to a symbol OL) overlap each other and the overlapped base materials are impregnated with a binder solution to heat and press the entirety thereof at predetermined temperature and pressure using a pressing plate PP.

As illustrated in FIG. 7(D), a thickness portion which includes a portion in which an overlapped portion OL is crushed becomes the high porosity portion 16c1 and a thickness portion which does not include a portion in which the overlapped portion OL is crushed becomes the low porosity portion 16c2 in the separator 16c manufactured in this manner. The thickness t16c of the separator 16c can be controlled using the heating and pressing process.

Figure 7:
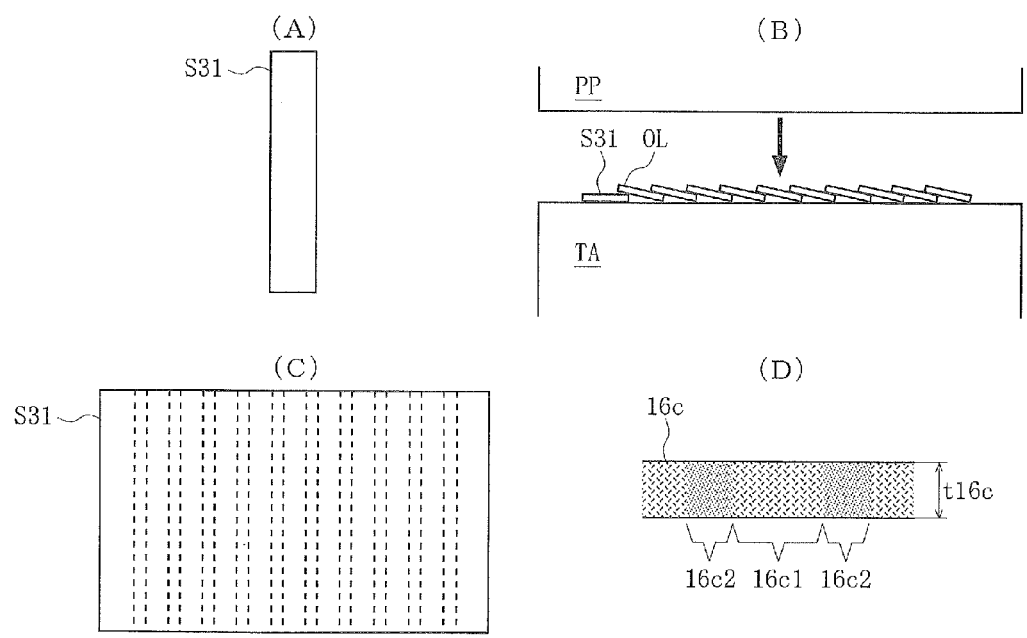
FIGS. 7(A) to 7(D) are explanatory diagrams of a first manufacture example of the separator illustrated in FIGS. 3 and 4.

While FIG. 7 illustrates the manufacture example corresponding to the separator 16c illustrated in FIG. 3, the separator illustrated in FIG. 4 can also be manufactured in the same manner if the size and the overlapping method of the sheet base material S31 are changed.

<Second Manufacture Example>

As illustrated in FIG. 8(A), first, a sheet base material S41 with a size larger than the size of the separator 16c is prepared and plural creases CR are formed in the sheet base material S41 in this manufacture example. Next, as illustrated in FIGS. 8(B) and (C), the sheet base material S41 which has the creases CR is disposed on the table TA and the sheet base material S41 is impregnated with a binder solution to heat and press the entirety thereof at predetermined temperature and pressure using a pressing plate PP.

As illustrated in FIG. 8(D), a thickness portion which includes a portion in which the creases CR are crushed becomes the high porosity portion 16c1 and a thickness portion which does not include a portion in which the creases CR are crushed becomes the low porosity portion 16c2 in the separator 16c manufactured in this manner. The thickness t16c of the separator 16c can be controlled using the heating and pressing process.

Figure 8:
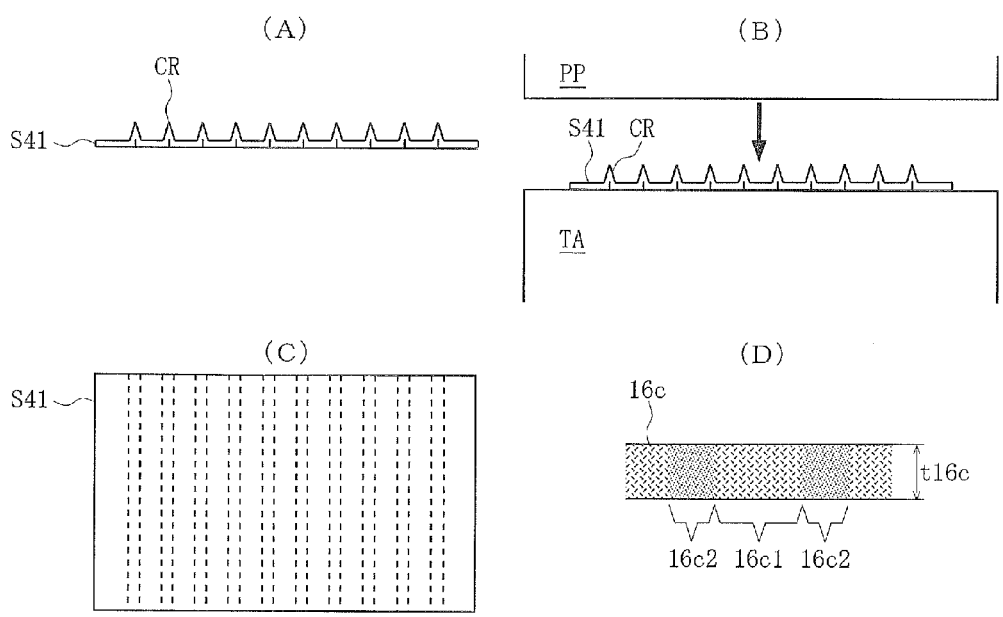
FIGS. 8(A) to 8(D) are explanatory diagrams of a second manufacture example of the separator illustrated in FIGS. 3 and 4.

While FIG. 8 illustrates the manufacture example corresponding to the separator 16c illustrated in FIG. 3, the separator illustrated in FIG. 4 can also be manufactured in the same manner if the size and the direction of the crease CR of the sheet base material S41 are changed.

<Third Manufacture Example (Not Shown)>

In a third manufacture example, first, a sheet base material with a size corresponding to the size of the separator 16c is prepared. Next, a filling material FM formed of porous fine particles such as alumina particles is printed on the upper surface of the sheet base material in a band shape at an interval to fill the inside of the sheet base material with the filling material FM. When two or more sheet base materials S21 overlap each other after being filled with the filling material FM, the overlapped base materials are impregnated with a binder solution and thereafter the entirety thereof is heated and pressed at predetermined temperature and pressure.

Similarly to the configuration illustrated in FIG. 6(c), a thickness portion which is not filled with the filling material FM becomes the high porosity portion 16c1 and a thickness portion which is filled with the filling material FM becomes the low porosity portion 16c2 in the separator 16c manufactured in this manner. The thickness t16c of the separator 16c can be controlled using the heating and pressing process when two or more sheet base materials S21 overlap each other after being filled with the filling material FM.

<<Effects Obtained by Reliance on Separator>>

While the separator 16c functions to deliver ions between the positive electrode 16a and the negative electrode 16b through the retained electrolytic solution, when the electrochemical device 10 is used for a long time by repeatedly performing charge and discharge thereof, a phenomenon in which the amount of the electrolytic solution retained in the separator 16c decreases occurs due to decomposition of the electrolytic solution and the like.

In a case where the separator is made of a fiber sheet having approximately uniform porosity in the related art, when the electrolytic solution retained in the separator is decreased, a delivery path for ions is narrowly secured through the electrolytic solution which adheres to the surface of the fiber. However, since the fiber which forms the separator is not entirely provided parallel to the thickness direction of the separator, the delivery path for the ions is elongated in comparison with when a necessary and sufficient amount of the electrolytic solution is retained, the resistance value of the storage element is increased due to the elongated delivery path, and the inner resistance value of the electrochemical device is increased due to the increase in the resistance value, causing a drop in output voltage.

In contrast, the separator 16c is formed such that the plural high porosity portions 16c1 from the upper surface to the lower surface in the thickness direction thereof and the plural low porosity portions 16c2 from the upper surface to the lower surface in the thickness direction thereof are arranged in the region which is interposed between the positive electrode 16a and the negative electrode 16b (refer to FIGS. 2 to 4). In addition, the upper surface of each of the high porosity portions 16c1 and the low porosity portions 16c2 in the region interposed between the positive electrode 16a and the negative electrode 16b of the separator 16c is in contact with the lower surface of the negative electrode 16b and the lower surface of each of the high porosity portions 16c1 and the low porosity portions 16c2 is in contact with the upper surface of the positive electrode 16a (refer to FIG. 1).

Accordingly, even if the electrolytic solution retained in the separator 16c is decreased, since the solution absorption of each of the low porosity portions 16c2 is higher than the solution absorption of each of the high porosity portions 16c1, the electrolytic solution in each of the high porosity portions 16c1 is accumulated in each of the low porosity portions 16c2 and a liquid path for ion delivery is secured between the positive electrode 16a and the negative electrode 16b by the electrolytic solution accumulated in each of the low porosity portions 16c2.

In other words, even if the electrolytic solution retained in the separator 16c is decreased, since, unlike the related art, the delivery path for ions is not elongated and the shortest delivery path for the ions can be secured, an increase in the resistance value of the storage element 16 is suppressed and an increase in the inner resistance value and a decrease in the output voltage of the electrochemical device 10 can be suppressed due to the suppression of the resistance value of the storage element.

<<Confirmation of Porosity of High Porosity Portions and Porosity of Low Porosity Portions of Separator>>

In order to confirm the preferable range (90 to 95%) of the porosity of the high porosity portions 16c1 of the separator 16c described in the <<Examples of Separator>>, four kinds of separators SE11 to SE14 corresponding to the separator 16c illustrated in FIG. 2 were manufactured according to the <First Manufacture Example> in the <<Manufacture Examples of Separator Illustrated in FIG. 2>>.

Specifically, four kinds of the first sheet base materials S11 (glass fiber 95 wt %, methyl cellulose binder 5 wt %) having different porosity and four kinds of the second sheet base materials S12 (glass fiber 95 wt %, methyl cellulose binder 5 wt %) having the same aperture ratio ((a total area of the notches NO+a total area of the through holes SH)/(a total area of the second sheet base material S12 before the notches NO and the through holes SH are formed)) and different porosity were prepared. An operation of overlapping one second sheet base material S12 and one first sheet base material S11 sequentially on a first sheet base material S11 was performed once, the overlapped base materials were impregnated with a methyl cellulose binder solution, and thereafter the entirety thereof was heated and pressed at a temperature of 150° C. and the maximum pressure of 1000 kPa so that the four kinds of separators SE11 to SE14 were manufactured.

The four kinds of manufactured separators SE11 to SE14 have the same thickness (200 μm), volume ratio of the high porosity portions 16c1 and the low porosity portions 16c2 (1:1) and porosity of the low porosity portions 16c2 (70%) and only differ in the porosity of the high porosity portions 16c1. The porosity of the high porosity portions 16c1 of the separator SE11 is 85%, the porosity of the high porosity portions 16c1 of the separator SE12 is 90%, the porosity of the high porosity portions 16c1 of the separator SE13 is 95%, and the porosity of the high porosity portions 16c1 of the separator SE14 is 97%.

Then, four kinds of PAS capacitors (maximum use voltage 3V) which have the same structure as that of the electrochemical device 10 illustrated in FIG. 1 were manufactured using the respective four kinds of separators SE11 to SE14. The positive electrode 16a and the negative electrode 16b of the storage element 16 in the PAS capacitors are made of a polyacenic organic semiconductor (PAS), and the electrolytic solution in which 5-azoniaspiro[4,4]nonane.BF4 dissolves in propylene carbonate is used Then, a float charge test in which a voltage of 2.5V is continuously applied to the four kinds of manufactured PAS capacitors under an atmosphere of 70° C. was performed and the resistance value (a unit is Ω) across the terminals 12 and 13 of the storage element 16 was measured by a tester (manufactured by Hioki E.E. CORPORATION, at a test frequency of 1 kHz) for each day of the voltage application.

Figure 9:
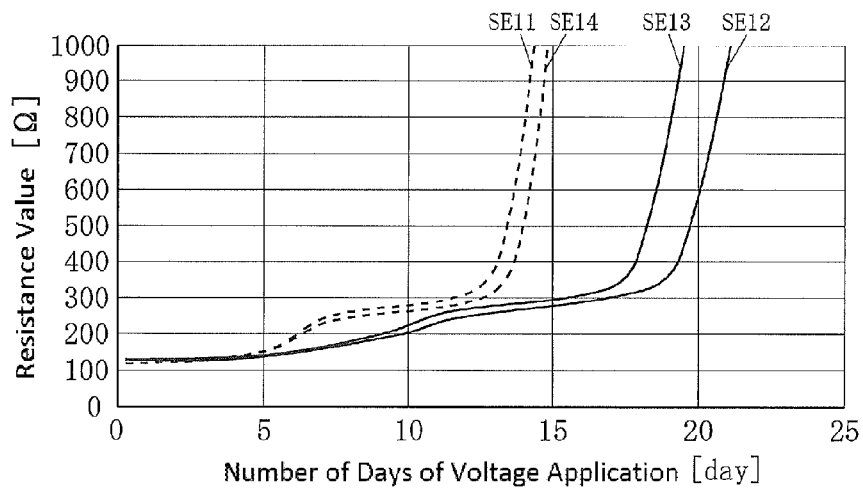
FIG. 9 is a diagram illustrating a result in which a preferable porosity range of high porosity portions of a separator is confirmed.

FIG. 9 is a view plotting each of measured results and in FIG. 9, a curved line indicated by SE11 shows the variation of the resistance value over time of the PAS capacitor using the separator SE11 (the porosity of the high porosity portions 16c1 is 85%), a curved line indicated by SE12 shows the variation of the resistance value over time of the PAS capacitor using the separator SE12 (the porosity of the high porosity portions 16c1 is 90%), a curved line indicated by SE13 shows the variation of the resistance value over time of the PAS capacitor using the separator SE13 (the porosity of the high porosity portions 16c1 is 95%), and a curved line indicated by SE14 shows the variation of the resistance value over time of the PAS capacitor using the separator SE14 (the porosity of the high porosity portions 16c1 is 97%).

As seen in FIG. 9, the increase in the resistance value over the days of the voltage application is significantly suppressed in the PAS capacitor using the separator SE12 (the porosity of the high porosity portions 16c1 is 90%) and the PAS capacitor using the separator SE13 (the porosity of the high porosity portions 16c1 is 95%) in comparison with the PAS capacitor using the separator SE11 (the porosity of the high porosity portions 16c1 is 80%) and the PAS capacitor using the separator SE14 (the porosity of the high porosity portions 16c1 is 97%). Accordingly, it can be understood that a preferable porosity range of the high porosity portions 16c1 of the separator 16c is 90 to 95%.

On the other hand, in order to confirm the preferable range (60 to 80%) of the porosity of the low porosity portions 16c2 of the separator 16c described in the <<Examples of Separator>>, four kinds of separators SE21 to SE24 corresponding to the separator 16c illustrated in FIG. 2 were manufactured according to the <First Manufacture Example> in the <<Manufacture Examples of Separator Illustrated in FIG. 2>>. A specific method of manufacturing the four kinds of separators SE21 to SE24 is similar to the method of manufacturing the four kinds of separators SE11 to SE14.

The four kinds of manufactured separators SE21 to SE24 have the same thickness (200 μm), volume ratio of the high porosity portions 16c1 and the low porosity portions 16c2 (1:1) and porosity of the high porosity portions 16c1 (90%) and only differ in the porosity of the low porosity portions 16c2. The porosity of the low porosity portions 16c2 of the separator SE21 is 55%, the porosity of the low porosity portions 16c2 of the separator SE22 is 60%, the porosity of the low porosity portions 16c2 of the separator SE23 is 80%, and the porosity of the low porosity portions 16c1 of the separator SE24 is 85%.

Then, four kinds of PAS capacitors (maximum use voltage 3V) which have the same structure as that of the electrochemical device 10 illustrated in FIG. 1 were manufactured using the respective four kinds of separators SE21 to SE24. The positive electrode 16a and the negative electrode 16b of the storage element 16 in the PAS capacitors are made of a polyacenic organic semiconductor (PAS), and the electrolytic solution in which 5-azoniaspiro[4,4]nonane.BF4 dissolves in propylene carbonate is used Then, a float charge test in which a voltage of 2.5V is continuously applied to the four kinds of manufactured PAS capacitors under an atmosphere of 70° C. was performed and the resistance value (a unit is Ω) across the terminals 12 and 13 of the storage element 16 was measured by a tester (manufactured by Hioki E.E. CORPORATION, at a test frequency of 1 kHz) for each day of the voltage application.

Figure 10:
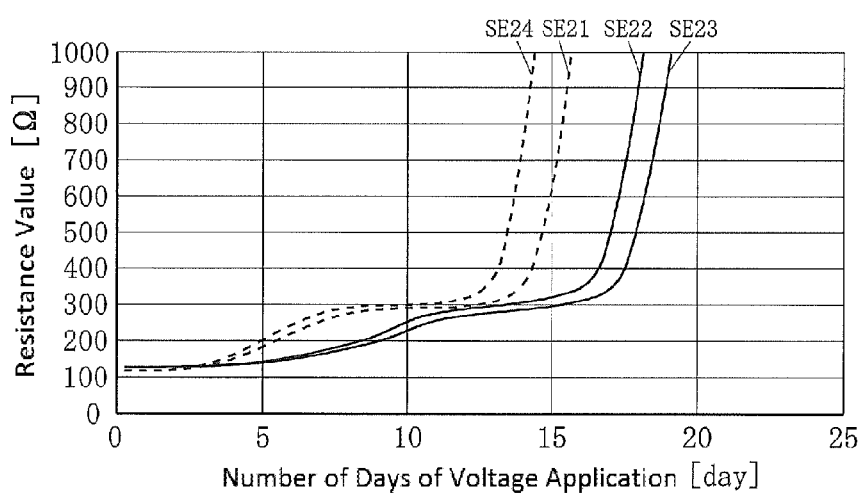
FIG. 10 is a diagram illustrating a result in which a preferable porosity range of low porosity portions of a separator is confirmed.

FIG. 10 is a view plotting each of measured results and in FIG. 10, a curved line indicated by SE21 shows the variation of the resistance value over time of the PAS capacitor using the separator SE21 (the porosity of the low porosity portions 16c2 is 55%), a curved line indicated by SE22 shows the variation of the resistance value over time of the PAS capacitor using the separator SE22 (the porosity of the low porosity portions 16c2 is 60%), a curved line indicated by SE23 shows the variation of the resistance value over time of the PAS capacitor using the separator SE23 (the porosity of the low porosity portions 16c2 is 80%), and a curved line indicated by SE24 shows the variation of the resistance value over time of the PAS capacitor using the separator SE24 (the porosity of the low porosity portions 16c1 is 85%).

As seen in FIG. 10, the increase in the resistance value over the days of the voltage application is significantly suppressed in the PAS capacitor using the separator SE22 (the porosity of the low porosity portions 16c2 is 60%) and the PAS capacitor using the separator SE23 (the porosity of the low porosity portions 16c2 is 80%) in comparison with the PAS capacitor using the separator SE21 (the porosity of the low porosity portions 16c2 is 55%) and the PAS capacitor using the separator SE24 (the porosity of the low porosity portions 16c2 is 85%). Accordingly, it can be understood that a preferable porosity range of the low porosity portions 16c2 of the separator 16c is 60 to 80%.

<<Confirmation of Volume Ratio of High Porosity Portions and Low Porosity Portions of Separator>>

In order to confirm the preferable range (8:2 to 2:8) of the volume ratio of the high porosity portions 16c1 and the low porosity portions 16c2 of the separator 16c described in the <<Examples of Separator>>, five kinds of separators SE31 to SE35 corresponding to the separator 16c illustrated in FIG. 2 were manufactured according to the <First Manufacture Example> in the <<Manufacture Examples of Separator Illustrated in FIG. 2>>.

Specifically, the first sheet base materials S11 (glass fiber 95 wt %, methyl cellulose binder 5 wt %) having a predetermined porosity and five kinds of the second sheet base materials S12 (glass fiber 95 wt %, methyl cellulose binder 5 wt %) having the same porosity as the first sheet base material S11 but different aperture ratios ((a total area of the notches NO+a total area of the through holes SH)/(a total area of the second sheet base material S12 before the notches NO and the through holes SH are formed)) were prepared. An operation of overlapping one second sheet base material S12 and one first sheet base material S11 sequentially on a first sheet base material S11 was performed once, the overlapped base materials were impregnated with a methyl cellulose binder solution, and thereafter the entirety thereof was heated and pressed at a temperature of 150° C. and the maximum pressure of 1000 kPa so that five kinds of separators SE31 to SE35 were manufactured.

The manufactured five kinds of separators SE31 to SE35 have the same thickness (200 μm), porosity (90%) of the high porosity portions 16c1 and porosity (75%) of the low porosity portions 16c2 and only differ in the volume ratio of the high porosity portions 16c1 and the low porosity portions 16c2. The volume ratio of the high porosity portions 16c1 and the low porosity portions 16c2 of the separator SE31 is 9:1, the volume ratio of the high porosity portions 16c1 and the low porosity portions 16c2 of the separator SE32 is 8:2, the volume ratio of the high porosity portions 16c1 and the low porosity portions 16c2 of the separator SE33 is 5:5, the volume ratio of the high porosity portions 16c1 and the low porosity portions 16c2 of the separator SE34 is 2:9, and the volume ratio of the high porosity portions 16c1 and the low porosity portions 16c2 of the separator SE35 is 1:9.

Then, five kinds of PAS capacitors (maximum use voltage 3V) which have the same structure as that of the electrochemical device 10 illustrated in FIG. 1 were manufactured using the respective five kinds of separators SE31 to SE35. The positive electrode 16a and the negative electrode 16b of the storage element 16 in the PAS capacitors are made of a polyacenic organic semiconductor (PAS), and the electrolytic solution in which 5-azoniaspiro[4,4]nonane.BF4 dissolves in propylene carbonate is used For reference, a separator SE36 of which the volume ratio of the high porosity portions 16c1 and the low porosity portions 16c2 is 10:0 and a separator SE37 of which the volume ratio of the high porosity portions 16c1 and the low porosity portions 16c2 is 0:10 were prepared and two kinds of PAS capacitors as above were additionally manufactured using the separators SE36 and SE37.

Then, a float charge test in which a voltage of 2.5V is continuously applied to the five+two kinds of manufactured PAS capacitors under an atmosphere of 70° C. was performed and the resistance value (a unit is Ω) across the terminals 12 and 13 of the storage element 16 was measured by a tester (manufactured by Hioki E.E. CORPORATION, at a test frequency of 1 kHz) for each day of the voltage application.

Figure 11:
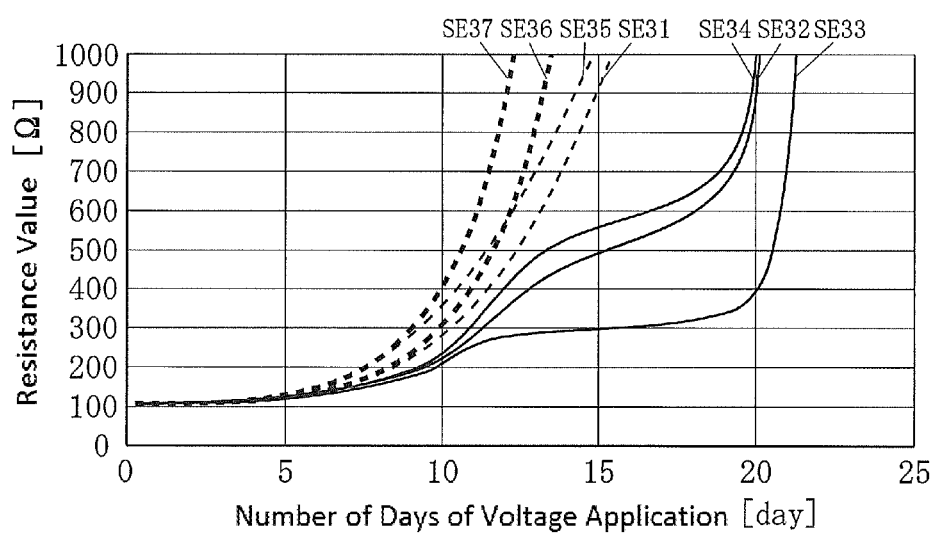
FIG. 11 is a diagram illustrating a result in which a preferable volume ratio range of high porosity portions and low porosity portions of a separator is confirmed.

FIG. 11 is a view plotting each of measured results and in FIG. 11, a curved line indicated by SE31 shows the variation of the resistance value over time of the PAS capacitor using the separator SE31 (the volume ratio of the high porosity portions 16c1 and the low porosity portions 16c2 is 9:1), a curved line indicated by SE32 shows the variation of the resistance value over time of the PAS capacitor using the separator SE32 (the volume ratio of the high porosity portions 16c1 and the low porosity portions 16c2 is 8:2), a curved line indicated by SE33 shows the variation of the resistance value over time of the PAS capacitor using the separator SE33 (the volume ratio of the high porosity portions 16c1 and the low porosity portions 16c2 is 5:5), a curved line indicated by SE34 shows the variation of the resistance value over time of the PAS capacitor using the separator SE34 (the volume ratio of the high porosity portions 16c1 and the low porosity portions 16c2 is 2:8), a curved line indicated by SE35 shows the variation of the resistance value over time of the PAS capacitor using the separator SE35 (the volume ratio of the high porosity portions 16c1 and the low porosity portions 16c2 is 1:9), a curved line indicated by SE36 shows the variation of the resistance value over time of the PAS capacitor using the separator SE36 (the volume ratio of the high porosity portions 16c1 and the low porosity portions 16c2 is 10:0), and a curved line indicated by SE37 shows the variation of the resistance value over time of the PAS capacitor using the separator SE37 (the volume ratio of the high porosity portions 16c1 and the low porosity portions 16c2 is 0:10).

As seen in FIG. 11, the increase in the resistance value over the days of the voltage application is significantly suppressed in the PAS capacitor using the separator SE32 (the volume ratio of the high porosity portions 16c1 and the low porosity portions 16c2 is 8:2), the PAS capacitor using the separator SE33 (the volume ratio of the high porosity portions 16c1 and the low porosity portions 16c2 is 5:5), the PAS capacitor using the separator SE34 (the volume ratio of the high porosity portions 16c1 and the low porosity portions 16c2 is 2:8) in comparison with the PAS capacitor using the separator SE31 (the volume ratio of the high porosity portions 16c1 and the low porosity portions 16c2 is 9:1), the PAS capacitor using the separator SE35 (the volume ratio of the high porosity portions 16c1 and the low porosity portions 16c2 is 1:9), the PAS capacitor using the separator SE36 (the volume ratio of the high porosity portions 16c1 and the low porosity portions 16c2 is 10:0) and the PAS capacitor using the separator SE37 (the volume ratio of the high porosity portions 16c1 and the low porosity portions 16c2 is 0:10). Accordingly, it can be understood that a preferable volume ratio range of the high porosity portions 16c1 and the low porosity portions 16c2 of the separator 16c is 8:2 to 2:8.

Industrial Applicability

The present invention (a separator for an electrochemical device and an electrochemical device) is not limited to the electrochemical device described above, and may be widely applied to separators used in other electrochemical devices in which a chargeable and dischargeable storage element having a configuration in which a separator is interposed between a positive electrode and a negative electrode and an electrolytic solution are sealed in a container and to the other electrochemical devices so that the object described in the "Technical Problem" is achieved by the application.

REFERENCE SIGNS LIST 10 electrochemical device
11 container
16 storage element
16a positive electrode
16b negative electrode
16c separator
16c1 high porosity portion
16c2 low porosity portion

The invention claimed is:

1. A separator for an electrochemical device having a structure in which a chargeable and dischargeable storage element having a configuration in which the separator is interposed between a positive electrode and a negative electrode and an electrolytic solution are sealed in a container, the separator comprising:
   a plurality of high porosity portions from one side surface to another side surface in a thickness direction of the separator; and
   a plurality of low porosity portions from the one side surface to the other side surface in the thickness direction of the separator,
   wherein the high porosity portions and the low porosity portions are arranged in a region interposed between the positive electrode and the negative electrode,
   wherein porosity of the high porosity portions is in a range of 90 to 95%, and porosity of the low porosity portions is in a range of 60 to 80%.

2. The separator for an electrochemical device according to claim 1,
   wherein a volume ratio of the high porosity portions and the low porosity portions in the region interposed between the positive electrode and the negative electrode is in a range of 8:2 to 2:8.

3. An electrochemical device having a structure in which a chargeable and dischargeable storage element having a configuration in which a separator is interposed between a positive electrode and a negative electrode and an electrolytic solution are sealed in a container, wherein the separator includes a plurality of high porosity portions from one side surface to another side surface in a thickness direction of the separator and a plurality of low porosity portions from the one side surface to the other side surface in the thickness direction, the high porosity portions and the low porosity portions being arranged in a region interposed between the positive electrode and the negative electrode, wherein porosity of the high porosity portions is in a range of 90 to 95%, and porosity of the low porosity portions is in a range of 60 to 80%.

4. The electrochemical device according to claim 3,
wherein the volume ratio of the high porosity portions and the low porosity portions in the region interposed between the positive electrode and the negative electrode is in a range of 8:2 to 2:8.

* * * * *